3,058,943
RIGID POLYVINYL CHLORIDE COMPOSITIONS CONTAINING LOW MOLECULAR WEIGHT STYRENE POLYMER
Basil P. Gray, Willoughby Hills, Ohio, and Charles W. Montgomery, Baton Rouge, La., assignors to Ethyl Corporation, New York, N.Y., a corporation of Delaware
No Drawing. Filed Nov. 3, 1958, Ser. No. 771,216
6 Claims. (Cl. 260—33.6)

This application is a continuation-in-part of application Serial No. 564,377, filed February 9, 1956, now abandoned.

The present invention relates to improved rigid thermoplastic compositions, and more particularly to novel rigid polyvinyl chloride polymer compositions possessing outstanding processing characteristics which render the compositions well suited for deep drawing, vacuum forming, extrusion, and film blowing applications.

Unplasticized polyvinyl chloride polymers are outstanding with regard to toughness and chemical resistant properties. Such materials are therefore potentially useful in the fabrication of rigid articles for use in the process industries where a combination of chemical resistance and toughness is of prime importance. Polyvinyl chloride, however, does possess some undesirable processing characteristics which have hindered its use in the fabrication of rigid articles. Polyvinyl chloride is generally available commercially as a fine white powder, and like all plastics must be melted or fluxed before being formed into final shape. This is accomplished by heat and mechanical action; and during the first phases of this operation the necessary ingredients, which in all cases include at least some thermal stabilizer, are worked in. If only thermal stabilizer is added, the material fluxes poorly and has such a high melt viscosity that it is difficult to get good molding or extrusion characteristics without thermally abusing the resin to the point of decomposition. This type of material is therefore not well suited for extrusion type operations. Films formed from unplasticized polyvinyl chloride also possess little hot extensibility, and accordingly cannot be used conveniently in vacuum forming or deep drawing operations. This lack of hot extensibility also renders the material unsuitable for film blowing types of applications.

These undesirable properties of polyvinyl chloride can be corrected to some extent by the use of conventional plasticizers. Although the incorporation of a plasticizer in polyvinyl chloride will improve the processability, the chemical resistant properties of the material are largely destroyed by the presence of the plasticizer. Plasticizers when added to any appreciable extent also severely lower the heat distortion point and rigidity of the finished material. Some success in rendering polyvinyl chloride suitable for extrusion has been achieved by initially fusing the fine polymer powder and thereafter chopping the fused mass into granules. Although the granules or pellets obtained in this matter can be extruded more readily than the original powder, the fusing and chopping operation is cumbersome and costly.

Accordingly, it is an object of this invention to overcome the foregoing disadvantages of the prior art and provide novel rigid thermoplastic compositions possessing improved processing characteristics. A further object of this invention is to provide a polyvinyl chloride composition possessing improved processing characteristics which render the composition suitable for use in operations such as extrusion, deep drawing, vacuum forming, and the like, in which hot extensibility is important. A still further object is to provide a rigid polyvinyl chloride polymer composition in the form of dry, free-flowing particles which can be handled with a maximum of ease and, of paramount importance, which can be easily fluxed into a homogeneous fluid body without fusing and chopping the material prior to use. Still other objects of our invention will become apparent from the following description.

The above and other objects of this invention are accomplished by providing a polyvinyl chloride polymer composition containing a relatively small amount of a styrene polymer; i.e., up to about 15 weight percent based on the weight of the polyvinyl chloride polymer. It has been discovered that by incorporating low molecular weight styrene polymers of sufficient compatibility, particularly styrene polymers or homologs thereof having an average molecular weight less than about 5000, in polyvinyl chloride polymer compositions, a product is obtained having a particular combination of improved processing characteristics and physical properties generally heretofore not possessed by the prior art rigid polyvinyl chloride polymer compositions. Our compositions, for example, can be used in the form of dry, free-flowing particles, e.g., powder, and this material can be easily fluxed and hence can be used directly in an extrusion apparatus. The adaptability of this composition for use in powdered form thus eliminates an appreciable amount of "heat history" previously necessary in other polyvinyl chloride materials, and thus gives final products having better physical properties and heat stability. The compositions also exhibit excellent vacuum forming and film blowing qualities which is attributed to the ability of our compositions to be stretched or extended at moderate temperatures, i.e., temperatures in the range of 300° F. to 400° F. This property is commonly referred to in the art as hot extensibility. It is also significant that the excellent hot extensibility displayed by our compositions is achieved without significantly lowering the heat distortion point of the finished article. Articles formed from our compositions will normally possess a heat distortion point of about 145° F. or higher. The resulting articles possess a slick glossy surface and, when unpigmented, are clear and water-white, thus rendering the material well suited for the fabrication of films and pipes where transparency is desirable. Up to the present time, no other rigid or unplasticized polyvinyl chloride compositions are known which can be extruded or otherwise formed into clear, transparent articles.

Although the aforesaid objects of our invention can generally be accomplished by providing only the two component blends, i.e., polyvinyl chloride polymer and low molecular weight styrene polymer, we have found that the advantageous effect contributed by the styrene polymer can be further enhanced, particularly for "blowing" operations, by incorporating into the blend a small amount of a partially hydrogenated terphenyl; i.e., up to about 10 weight percent based on the weight of the polyvinyl chloride polymer. The terphenyl has a synergistic effect upon the styrene polymer and renders the latter more compatible with the polyvinyl chloride ingredient and permits greater flexibility regarding concentration of styrene polymer employed in the composition.

The following example in which the concentrations are given on a weight basis will serve to illustrate one embodiment of our invention.

*Example 1*

To a vessel provided with external heating means and a counter rotating stirring were added 100 parts of polyvinyl chloride (Geon 103 EP, manufactured by B. F. Goodrich), in the form of a dry porous powder. While stirring, the vessel was heated to 150° F. and 2 parts of a low molecular weight liquid styrene polymer (average molecular weight 250) were added along with 7 parts of a partially hydrogenated terphenyl and 2 parts of dibutyl tin mercaptide thermal stabilizer. The ingredients were stirred for a period of 20 minutes until a dry homogeneous blend was obtained. The resulting composition was a dry free-flowing white powder. Rigid pipe was fabricated directly from this composition by feeding the dry powder to a plastic extruder. The extruder employed a one-half inch die and the extrusion was conducted at a die temperature of 360° F. and a stock temperature of 410° F. No difficulties were encountered during the extrusion and the resulting rigid pipe was water-clear and possessed a slick glossy surface substantially free of "fish-eyes" and other imperfections. The Izod notched impact strength of the resultant pipe was 0.5 to 0.75 ft.-lbs. per inch of notch. The pipe possessed a hardness of 65 (Rockwell hardness scale M) and its heat distortion point as determined by A.S.T.M. Test Method 648 was 145° F. The pipe was immersed in acetone for two hours and exhibited no deterioration, indicating complete fusion of the polymer particles during extrusion.

Although in the above example a simple counter rotating stirrer was employed to blend the ingredients of our composition, any convenient blending technique and apparatus can be used. In commercial practice, however, it is preferred to use a conventional ribbon type blender. The blending operation can be successfully conducted either at room or elevated temperature but it is preferred to employ a temperature between about 150° to 175° F. The time required for complete blending will usually not exceed 20 to 40 minutes. At the conclusion of the blending operation, the product is in the form of a homogeneous, dry, free-flowing powder which can either be added directly to an extruder or other type fabrication machine or cooled and bagged for shipment or storage.

Within limits, the relative concentrations of the various ingredients incorporated in the blend are not particularly critical but are important. The concentration of the styrene polymer should be between about 1 and 15 weight percent and preferably between 1 and 10 weight percent, based on the weight of the polyvinyl chloride polymer. In accordance with the preferred embodiment of our invention, partially hydrogenated terphenyl is incorporated in the blend along with the polyvinyl chloride polymer and styrene polymer, since it has been found that the use of terphenyl will further increase the hot extensibility and processability of the blend. The partially hydrogenated terphenyl can be employed in concentrations between about 1 to 10 weight percent although it is preferred to use between about 2 and 7 weight percent based on the weight of the polyvinyl chloride polymer. As pointed out below, the composition can be varied within the above limits in order to achieve blends tailored for specific applications.

It is preferred practice to also include in our compositions one or more of the conventional thermal stabilizers normally employed in polyvinyl chloride compositions. Typical examples of such stabilizers are calcium stearate, strontium naphthenate, dibutyltin dilaurate, dibenzene sulfonamide, anhydrobisdibutyl polystannanediol dibutyl ester, barium laurate, cadmium 2-ethyl hexoate, cadmium 2-ethyl hexoate naphthenate mixture, zinc 2-ethyl hexoate, anhydrous sodium pentaoctyl tripolyphosphate, epichlorohydrin, diphenylolpropane, cadmium laurate, tribasic lead sulfate, tribasic lead maleate, dibasic lead phthalate, sodium pentacapryl tripolyphosphate, dibutyl tin diacetate, dibutyl tin maleate, dibutyl tin mercaptide, strontium ricinoleate, barium ricinoleate, and cadmium ricinoleate. When it is desired that the resulting article be water-clear, organo-tin compounds, particularly the dialkyl tin mercaptides, such as dibutyl tin mercaptide have been found to be especially well suited as stabilizers.

The thermal stabilizer is normally employed in concentrations between about 0.1 to 10 weight percent based on the weight of the polyvinyl chloride polymer. A preferred concentration for the stabilizer is between about 1 to 5 weight percent based on the weight of the polyvinyl chloride polymer. Mixtures of the above stabilizers can also be employed but the total concentration should be within the above ranges.

Since one of the principal advantages of the compositions of this invention is that they are obtained in the form of dry, free-flowing particles, the polyvinyl chloride component to be used in preparing this blend should be of the easy processing type, i.e., a polymer in the form of dry, porous, discrete particles. Vinyl chloride polymers having a K-value of between about 58 and 68 are preferred, and especially those polymers possessing a K-value of between about 62–24. Such polymers can be prepared by techniques well known in the art. Polyvinyl chloride is prepared from a dispersion or suspension of liquid vinyl chloride in an aqueous medium. The reaction mixture will normally contain up to about 4 weight percent of a conventional peroxide polymerization catalyst based on the weight of the vinyl chloride and, an amount of water equivalent to from about 2 to 5 times the weight of the vinyl chloride. In addition, a minor amount of a synthetic emulsifying agent and a small amount of a water soluble stabilizing colloid are also present in the reaction mixture. Enhanced heat stability can also be imparted to the resulting polyvinyl chloride by including in the polymerization reaction mixture a minor amount of an alkali metal phosphate. The apparatus used is normally a sealed autoclave and the polymerization carried out by agitating the reaction mixture at a temperature between about 85° and 160° F. The polymerization temperature in a large measure controls the molecular weight of the polymer and generally the molecular weight will decrease with increasing temperature. A polymerization temperature of between about 120° and 130° F. has been found especially well suited to achieve a polymer having the desired properties for use in our invention.

When the above example is repeated using commercial polyvinyl chloride resins sold under the trade names of Exon 925 and Opalon 300, similar results are obtained.

The following example in which the proportions stated are on a weight basis, is given to illustrate one method of preparing a polyvinyl chloride polymer suitable for use in our invention. This example is not to be construed as in any way limiting our invention since various processes can be employed to produce suitable polyvinyl halide resin.

*Example II*

To a water jacketed autoclave provided with a stirrer was fed:

| | Parts |
|---|---|
| Water | 225 |
| Vinyl chloride | 100 |
| Lauroyl peroxide | 0.3 |
| Dioctyl sulfosuccinate | 0.1 |
| Methyl cellulose | 0.1 |

The dioctyl sulfosuccinate was first dissolved in water at a temperature of about 165° F. A part of this solution was used to make a paste of the methyl cellulose which was then stirred into the remaining water-dioctyl sulfosuccinate solution by stirring for a period of about 9 hours. This solution was then added to the autoclave. The lauroyl peroxide catalyst was added and the autoclave purged with vinyl chloride. The vinyl chloride (100 parts) was then blow into the autoclave and polymerized at a temperature of 122° F. for a period of 11 hours, at which time the pressure dropped and the excess vinyl chloride was vented. Disodium phosphate was added in an amount equivalent to 2 percent based upon the original charge of vinyl chloride and the mixture was stirred for 1½ hours. The polymerization reaction mixture was thereafter centrifuged and washed with ½ gallon of water per pound of resin. Eighty-three (83) percent of the vinyl chloride was polymerized. The polymer so prepared possessed a K-value of about 62, and a bulk density of 0.41 gram/ml.

Other methods for preparing polyvinyl chloride polymer suitable for use in the present invention are described in U.S. Patents 2,494,517 and 2,528,469.

The styrene polymer used in formulating our compositions is generally selected from the lower molecular weight polymers of styrene and alkyl substituted styrene, such as the vinyl toluenes, particularly meta and para vinyl toluene, vinyl, xylene, α-methyl styrene, methyl (α-methyl) styrene, and the like. Although it is preferred that the polymer be made from pure styrene, polymer prepared from alkyl substituted styrene or from crude mixtures of styrene and alkyl substituted styrenes can successfully be used, and accordingly, the term styrene polymer is used to denote any such polymer. It is important, however, that the styrene polymer be of sufficiently low molecular weight to be compatible. In this connection, the average molecular weight preferred for the styrene polymer is between about 200 and 5,000. Hence, a styrene dimer can be employed as can the trimer, tetramer, and slightly higher polymers. Styrene polymers having an average molecular weight no greater than about 1000 are especially preferred.

The lower molecular weight styrene polymers employed in the present invention can be prepared by methods known in the art. Typical styrene polymers which can be used and which are available commercially are "Piccolastic A–5," which are low molecular weight styrene polymers described by Handbook of Material Trade Names, O. T. Zimmerman and Irvin Lavin, Industrial Research Service, Dover, New Hampshire (1953), page 443–444, "Dow 276–V–2" and "Dow 276–V–9," which are viscous methyl-α-styrene polymers described by Schildknect, Vinyl and Related Polymers, vol. 7 page 135, (1952), John Wiley Publishing Company.

As previously pointed out, it is preferred to employ a small amount of a partially hydrogenated terphenyl in our compositions. Although any of the pure terphenyl isomers can be partially hydrogenated and used, we prefer to employ a partially hydrogenated mixture of isomeric terphenyls since the isomeric mixtures are more readily available. Terphenyl is normally obtained as a by-product in the manufacture of biphenyl by the pyrolysis of benzene at elevated temperatures, the biphenyl process being well known in the art. The high boiling by-products obtained in the manufacture of biphenyl contain a mixture of the terphenyl isomers, and although m-terphenyl predominates, the ortho and para isomers are also present. The recovery of this isomeric mixture from these high boiling by-products is described by Kirk and Othmer, Encyclopedia of Chemical Technology, vol. 5, p. 150, The Interscience Encyclopedia, Inc., New York (1950). The mixture of isomeric terphenyls thus obtained is then subjected to incomplete hydrogenation so as to form the partially hydrogenated terphenyl which is used in our invention.

The partial hydrogenation of terphenyl can be conveniently carried out in a stirred autoclave using a conventional hydrogenation catalyst such as finely divided nickel. The amount of catalyst employed is generally about two weight percent based on the weight of the terphenyl. While stirring, the ingredients are heated for a period of about twelve hours at a temperature of about 390° F. and under a hydrogen pressure of 50 pounds. At the end of this period the spent catalyst is removed by filtration and an equivalent amount of fresh catalyst added. The hydrogenation is then continued for a period of about 15 hours at a somewhat higher temperature of about 465° F. under a hydrogen pressure of about 900 pounds. The autoclave and its contents are then cooled and the catalyst removed from the product by filtration. The product is obtained in the form of a colorless, oily liquid. In general, the degree of hydrogenation is not critical but should not exceed the point wherein the product is no longer liquid. Generally, the terphenyl is hydrogenated from 1 to 5 percent of theory.

Although the dry, free-flowing polyvinyl chloride polymer blends of this invention are useful in various types of forming operations wherein the end product desired is a rigid thermoplastic, the composition finds its greatest utility as a dry extrusion blend which can be charged directly to an extrusion apparatus. The material is admirably suited for the fabrication of rigid pipe and tubing and, by proper selection of the concentration of the various components employed, rigid films can be blown readily from our composition. Because of the excellent hot extensibility of our compositions, films made therefrom are well suited for subsequent use in vacuum forming or deep drawing operations.

As indicated above, the specific composition to be employed in any particular instance will depend to a large extent upon the type of product or article to be fabricated from the polymer. For example, when the composition is to be employed in the manufacture of rigid pipe, it is preferable that the blend used have a composition falling within the following limits, all proportions being expressed as weight percent based on the weight of polyvinyl chloride polymer:

|  | Percent |
|---|---|
| Styrene polymer | 1–5 |
| Partially hydrogenated terphenyl | 0–7 |

Thermoplastic films are generally prepared by a combined extrusion and blowing technique. In this instance the polymer composition is fused in an extrusion machine and extruded in the form of a tube. Compressed air is forced into the tube and, while continuing the extrusion, a film is blown from this tube. This technique necessitates the use of a resin which possesses a high degree of ductility at moderate temperatures. The compositions of our invention are admirably suited for this application and films of various thicknesses can be readily prepared by this technique. When the composition is to be employed in forming these rigid films, the various components are preferably employed in the following proportions, all proportions being expressed as weight percent based on the weight of the polyvinyl chloride polymer:

|  | Percent |
|---|---|
| Styrene polymer | 2–10 |
| Partially hydrogenated terphenyl | 2–10 |
| Tin stabilizer | 1–5 |

The following examples will serve to illustrate specific compositions within the scope of our invention and point up both the manner in which the concentrations of the ingredients can be varied to achieve specific results and the advantages of our compositions over the prior art rigid polyvinyl chloride polymers. All concentrations are given on a weight basis.

*Example III*

Using the blending technique described in Example I, a dry, free-flowing powder was formulated having the following composition:

|  | Parts |
|---|---|
| Polyvinyl chloride (K-value of 62) | 94 |
| Styrene polymer (av. mol. wt. 500) | 4 |
| Dibutyl tin thioglycollate | 2 |

This composition was then charged directly to a plastics extruder having a standard ½ inch pipe die and rigid pipe was formed. The extruder was operated at a die temperature of 375° F. and a stock temperature of 410° F. No difficulties were encountered in extruding the polymer. Upon cooling, the resulting rigid pipe was examined and found to possess a slick glossy surface and was water-clear. This pipe possessed a heat distortion point of 159° F. (determined by A.S.T.M. Test Method 648) and Rockwell hardness (scale M) of 66.

Example IV

Rigid pipe was formed in the manner described in Example III using the following polymer composition:

| | Parts |
|---|---|
| Polyvinyl chloride (K-value of 60) | 93 |
| Styrene polymer (av. mol. wt. 500) | 3 |
| Partially hydrogenated terphenyl (2%) | 2 |
| Dibutyl tin dilaurate stabilizer | 2 |

In this run the extruder was operated at a die temperature of 350° F. and a stock temperature of 395° F. No difficulties were experienced in extruding the polymer and forming a water-clear rigid pipe. This pipe possessed a slick glossy surface and a heat distortion point of 154° F. as determined by A.S.T.M. Test Method 648.

Example V

Example III was repeated using the same technique and composition except that the polyvinyl chloride employed had a K-value of 58. The resulting pipe possessed a slick glossy surface and was water-clear. The heat distortion point as determined by A.S.T.M. Test Method 648 was 149° F.

Example VI

To illustrate the advantages of our composition over the prior art, a commercially available rigid polyvinyl chloride extrusion composition was used in the fabrication of extruded pipe by the technique described in the above examples. This commercial composition consisted of polyvinyl chloride of medium molecular weight (K=62–68), an organotin stabilizer and a calcium stearate lubricant. This mixture was thereafter fluxed on a mill and chopped into small, uniform pellets. In this instance, the extrusion was carried out at a die temperature of 400° F. and a stock temperature of 400° F. These processing temperatures are higher than those used in the above examples since it was found that when using this prior art material the higher temperatures were necessary in order to achieve a slick, glossy surface on the finished article. The resulting pipe formed from the prior art material was cloudy and opaque in contrast to the water-clear transparency achieved when using the compositions of this invention.

When the above example is repeated using a dry powder blend, instead of the fused pellets, the composition has a low rate of extrusion, and the final product has a rough, dull surface. When the latter product is immersed in acetone for 2 hours, it deteriorates badly, indicating incomplete fluxing of the polyvinyl chloride particles during extrusion.

Example VII

In this run a polymer having the following composition was employed:

| | Parts |
|---|---|
| Polyvinyl chloride (K-value of 60) | 91 |
| Styrene polymer (av. mol. wt. 400) | 5 |
| Partially hydrogenated terphenyl (HB-40, manuf. by Montsanto Chem. Co.) | 2 |
| Thermal stabilizer (thio organotin cpd.) | 2 |

These ingredients were blended into a homogeneous dry, free-flowing powder using the technique described in Example I. This dry blend was then fed directly to a plastic extruder having ½ inch pipe die and operated at a die temperature of 375° F. and a stock temperature of 410° F. The polymer was extruded in the form of a pipe and, while continuing the extrusion, compressed air was forced into this pipe so as to extend the polymer into a thin rigid film having a thickness of less than 1 mil. The film so formed was water-clear and possessed a slick glossy surface. Its heat distortion point was 149° F. (A.S.T.M. Test Method 648) and its tensile strength as formed was 12,000 p.s.i.

Example VIII

A portion of film having a thickness of 3 mils and formed in the manner described in Example VII was cut into a sheet one foot square and placed in a vacuum mold. The mold cavities were two inches square and had a maximum depth of draw of ⅞ inch. The sheet was heated to a temperature of 260° F. and a vacuum applied. Upon cooling it was found that the sheet had been extended readily so as to conform with the shape of the mold. The resulting molded product was a rigid, water-clear article and possessed excellent surface gloss.

Example IX

Using the procedure as described in Example VII a rigid film having a thickness of less than 1 mil was formed from the following polymer composition:

| | Parts |
|---|---|
| Polyvinyl chloride (K-value of 60) | 89 |
| Alpha methyl styrene dimer | 2 |
| Partially hydrogenated terphenyl (HB-40) | 7 |
| Dibutyl tin dilaurate stabilizer | 2 |

The rigid film so obtained was water-clear and, as in the above examples, the material contained substantially no imperfections and possessed excellent surface gloss.

Example X

Example IX is repeated except that the following polymer composition is employed:

| | Parts |
|---|---|
| Polyvinyl chloride (K-value of 62) | 78 |
| Styrene polymer (av. mol. wt. 400) | 11 |
| Partially hydrogenated terphenyl (HB-40) | 7 |
| Dioctyl tin dilaurate stabilizer | 4 |

The results obtained are substantially similar to those of Example IX.

Example XI

Example VII was repeated except that in this instance a commercially available rigid polyvinyl chloride extrusion composition was employed as the feed stock. The extruder was operated at a die temperature of 400° F. and a stock temperature of 400° F. It was found that even at these elevated temperatures it was virtually impossible to blow a film from this material. When compressed air was admitted to the extruded pipe the material was extended only slightly before tearing. The resulant article was cloudy and opaque.

As demonstrated by the above examples, our compositions possess a unique combination of processing characteristics and physical properties generally heretofore not possessed by prior art rigid polyvinyl chloride polymers. Articles formed from our composition are outstanding with regard to physical appearance in that they possess a slick, glossy surface and have a water-clear transparency. Similarly, the above examples illustrate the high degree of hot extensibility possessed by our compositions and this property is achieved without adversely effecting the heat distortion point or rigidity of the final product. Generally articles formed from our composition will possess a heat distortion point between about 145° and 170° F. In general, the rigid polyvinyl chloride compositions of this invention have a Modulus of Elasticity in Flexure of at least 3.0×10⁵ p.s.i. Modulus of elasticity of the material tested as a simple beam of rectangular cross-section loaded in mid-span, is calculated as follows:

$$E = \frac{L^3}{4bd^3}\left(\frac{P}{Y}\right)$$

where:

$E$ = modulus of elasticity in bending in p.s.i.
$L$ = distance between points of support in inches $b$ = width of beam tested in inches
$d$ = depth of beam tested in inches
$P/Y$ = slope of initial straight line portion of load-deformation curve in p.s.i. deflection While the above examples illustrate a number of the thermal stabilizers, other conventional polyvinyl chloride stabilizers such as dibutyl tin, cadmium laurate and the like can be used with equal success. Also in the above examples the composition contained no pigment or filler, and these were purposely omitted to illustrate the unusual degree of clarity possessed by our compositions. Pigments or fillers can, of course, be incorporated into our compositions if desired. It is therefore to be understood that the above examples are given merely to illustrate specific embodiments of our invention and it is intended by the following claims to cover all modifications within the spirit and scope of our invention.

We claim:
1. A rigid thermoplastic polyvinyl chloride composition comprising an admixture of polyvinyl chloride having a K-value between about 58 and 68 and about 1 to 10 weight percent, based upon the weight of said polyvinyl chloride, of a low molecular weight styrene polymer selected from the group consisting of polystyrene and homopolymers of alkyl substituted styrene having an average molecular weight of from between about 200 and 1000.

2. The composition of claim 1 wherein said styrene polymer is polystyrene.

3. The composition of claim 1 wherein said composition contains 0.1 to 10 weight percent, based upon the weight of said polyvinyl chloride, of a thermal stabilizer.

4. A rigid thermoplastic polyvinyl chloride composition comprising an admixture of (1) polyvinyl chloride having a K-value between about 58 and 68, (2) about 1 to 10 weight percent of polystyrene having an average molecular weight of from between about 200 and 1000, and (3) up to about 10 weight percent of a partially hydrogenated terphenyl, said weight percent of said polystyrene and said terphenyl being based upon the weight of said polyvinyl chloride.

5. A rigid thermoplastic polyvinyl chloride composition comprising an admixture of (1) polyvinyl chloride having a K-value between about 62 and 64, (2) about 1 to 10 weight percent of polystyrene polymer having an average molecular weight of from between about 200 and 1000, and (3) about 1 to 5 weight percent of a dialkyltin mercaptide, the weight percent of said polystyrene and said mercaptide being based upon the weight of said polyvinyl chloride.

6. A rigid thermoplastic polyvinyl chloride comprising an admixture of polyvinyl chloride, about 7 weight percent polystyrene having an average molecular weight of 250, about 7 weight percent of a partially hydrogenated terphenyl, and about 2 weight percent of dibutyltin mercaptide; the weight percent of said polystyrene, said terphenyl and said mercaptide being based upon the weight of said polyvinyl chloride.

References Cited in the file of this patent

UNITED STATES PATENTS

| | | |
|---|---|---|
| 2,377,231 | Hayes | May 29, 1945 |
| 2,538,900 | Ehrlich | Jan. 23, 1951 |
| 2,590,834 | Faulkner et al. | Apr. 1, 1952 |
| 2,791,600 | Schwaegerle | May 7, 1957 |
| 2,882,252 | Stefanik | Apr. 14, 1959 |
| 2,952,655 | Beck | Sept. 13, 1960 |

FOREIGN PATENTS

| | | |
|---|---|---|
| 555,261 | Canada | Apr. 1, 1958 |

OTHER REFERENCES

Mast et al.: O.G., volume 657, pages 1584–1585, Apr. 29, 1952, S.N. 48,543 abstract.

Modern Plastics Encyclopedia Issue, September 1957, volume 35, No. 1A, page 379, Plastics Catalogue Corp., Bristol, Conn.

Buttrey: Plasticizers, 2nd edition, Cleaver-Hume Press, London, 1957, page 134.